United States Patent [19]
Goldsmith

[11] Patent Number: 5,319,493
[45] Date of Patent: Jun. 7, 1994

[54] VIEWING SYSTEM FOR MICROSCOPE
[76] Inventor: Stephen Goldsmith, 403 N. Minnesota Ave., Glendora, Calif. 91740
[21] Appl. No.: 976,504
[22] Filed: Nov. 13, 1992
[51] Int. Cl.$^5$ .............................................. G02B 21/00
[52] U.S. Cl. ..................... 359/368; 359/372
[58] Field of Search ................ 359/368, 372

[56] References Cited
U.S. PATENT DOCUMENTS 1,964,239  6/1934  Bauersfeld ........................... 359/372
4,576,450  3/1986  Westphal ............................. 359/372

Primary Examiner—Scott J. Sugarman
Attorney, Agent, or Firm—J. W. Gipple

[57] ABSTRACT

An optical viewing system is described which permits viewing through a microscope at a more comfortable and advantageous angle. The device of the invention attaches between the body of the microscope and the eye piece and can be either rigid in its configuration or adjustable to permit varying angles of view. Various optical systems ca be employed within the viewing device of the invention to preserve optical integrity.

6 Claims, 5 Drawing Sheets

Fig. 3
PRIOR ART
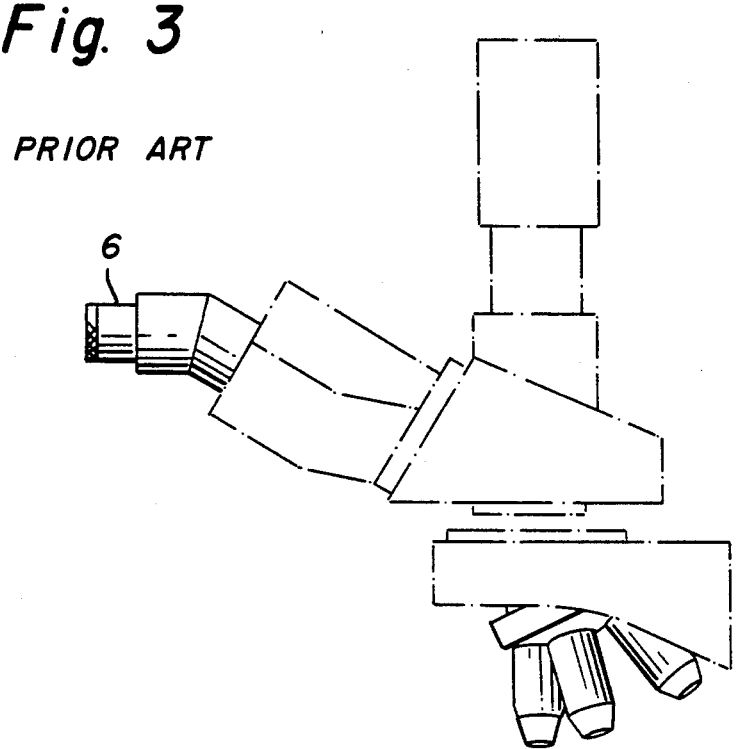
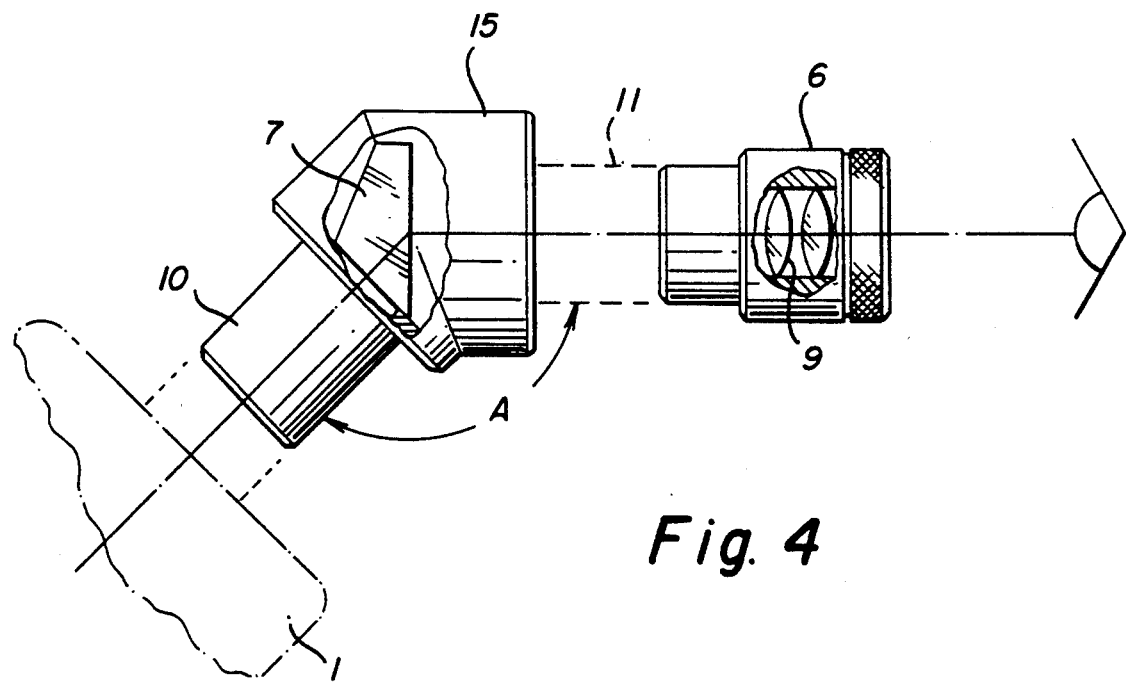
Fig. 4

VIEWING SYSTEM FOR MICROSCOPE

SUMMARY OF THE INVENTION

The present invention is directed to an optical viewing device to facilite viewing of objects with a microscope. More particularly the present invention is directed to a viewing device which is adapted to be inserted between the eye piece and body of a conventional microscope to provide an improved angle of viewing for the user, for example, by having the eye piece aligned parallel to the stage of the microscope.

BACKGROUND OF THE INVENTION

At present, conventional microscopes require that the viewer bend his head forward at approximately a 45 degree angle in order to view images from the microscope. This is both an unnatural and anatomically incorrect position for the cervical vertebrae and creates undue stress on the neck, shoulders and back. Continued stress can cause pain in these areas and can create a chronic degenerative process of the cervical vertebrae. Microscope eye pieces as currently used, are adjustable only for horizontal movement to accommodate the distance between the viewer's eyes. Adjustment of the individual eye piece to correct for the differences in the viewer's eyes is also provided. However, there is currently no provision for adapting conventional microscope heads to adjust for the downward angle of view.

It is, accordingly, an object of the present invention to provide a multiple angle viewing system for microscopes which can easily and quickly be installed on the microscope between the eye piece and the body of the microscope.

It is a further object of the present invention to provide an optical viewing system for microscopes which can be adjusted to various angles to improve the angle of viewing through the microscope.

Yet a further object of the present invention is to provide an improved optical viewing system for microscopes which alleviates stress on the head, neck and shoulders of the user.

BRIEF DESCRIPTION OF THE DRAWINGS

FIG. 3 is a side view of a conventional microscope using a mirror system between the eye piece and the body of the microscope.

FIG. 4 is a side cut away view of one embodiment of the present invention using prisms in the path of the image.

DETAILED DESCRIPTION OF THE INVENTION

In accordance with the present invention, an optical viewing system for use with a conventional microscope is provided which essentially compromises an elongated tube whose longitudinal axis can be bent at an oblique angle and which is adapted to be attached at one end to the body of a microscope and at the other end to the eye piece of a microscope. At a position on the elongated tube of the invention intermediate to it ends means are provided for transmitting the optical image viewed by the microscope through the tube so that it is received intact and in an unimpaired condition at the eye piece. Suitable means for conducting the optical image through the bent elongated tube of the invention can be a system of mirrors or prisms or a fiber optic bundle. The elongated tube of the invention ca be either rigid or flexible to allow adjustment of the oblique angle or fixed at a 90 degree angle.

Figure 1:
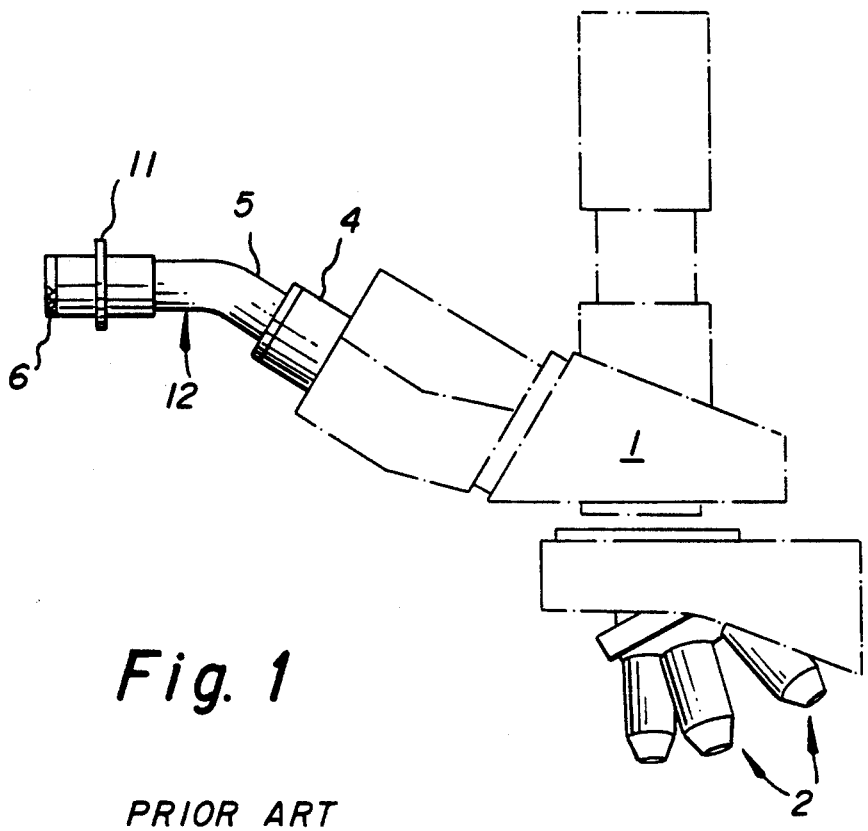
FIG. 1 is a side view of a conventional bi-ocular microscope showing an embodiment of the present invention employing a fiber optic bundle between the body of the microscope and the eye piece.

The invention will however, be more fully appreciated by having specific reference to the drawings. Directing attention initially to FIG. 1 of the drawings, a conventional microscope having a body 1 is shown with multiple objectives 2. The eye piece 6 is connected by means of a collar 11 through angled tube 5 which contains a fiber optic light transmitting bundle 12 to collar 4 o the body of the microscope.

Figure 2:
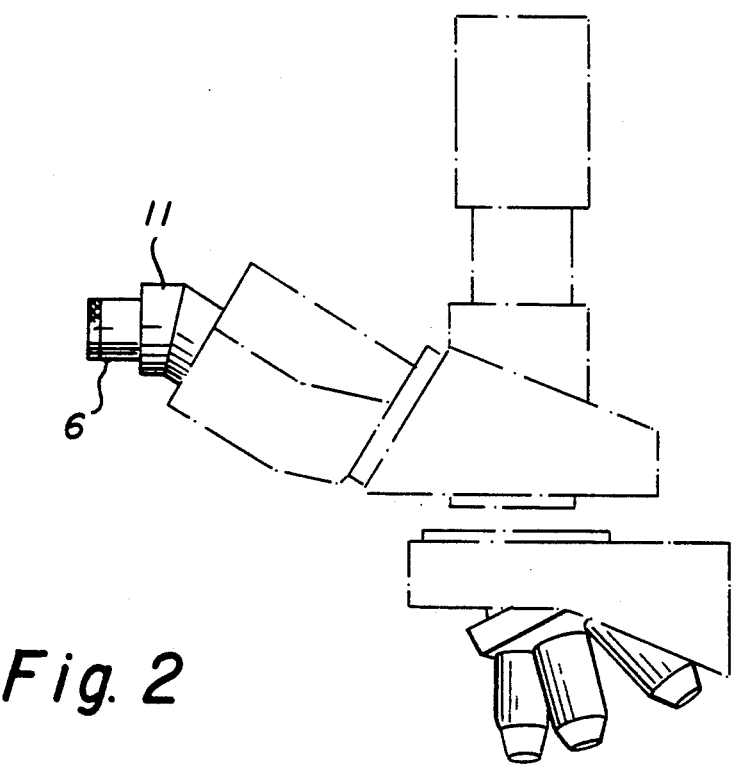
FIG. 2 is another side view of a conventional microscope which employs prism between the body of the microscope and the eye piece.

FIG. 2 of the drawings, illustrates an additional embodiment of the invention whereby the eye piece 6 is connected by means of collar 11 to a prism system as further shown in FIG. 4 of the drawings.

Figure 6:
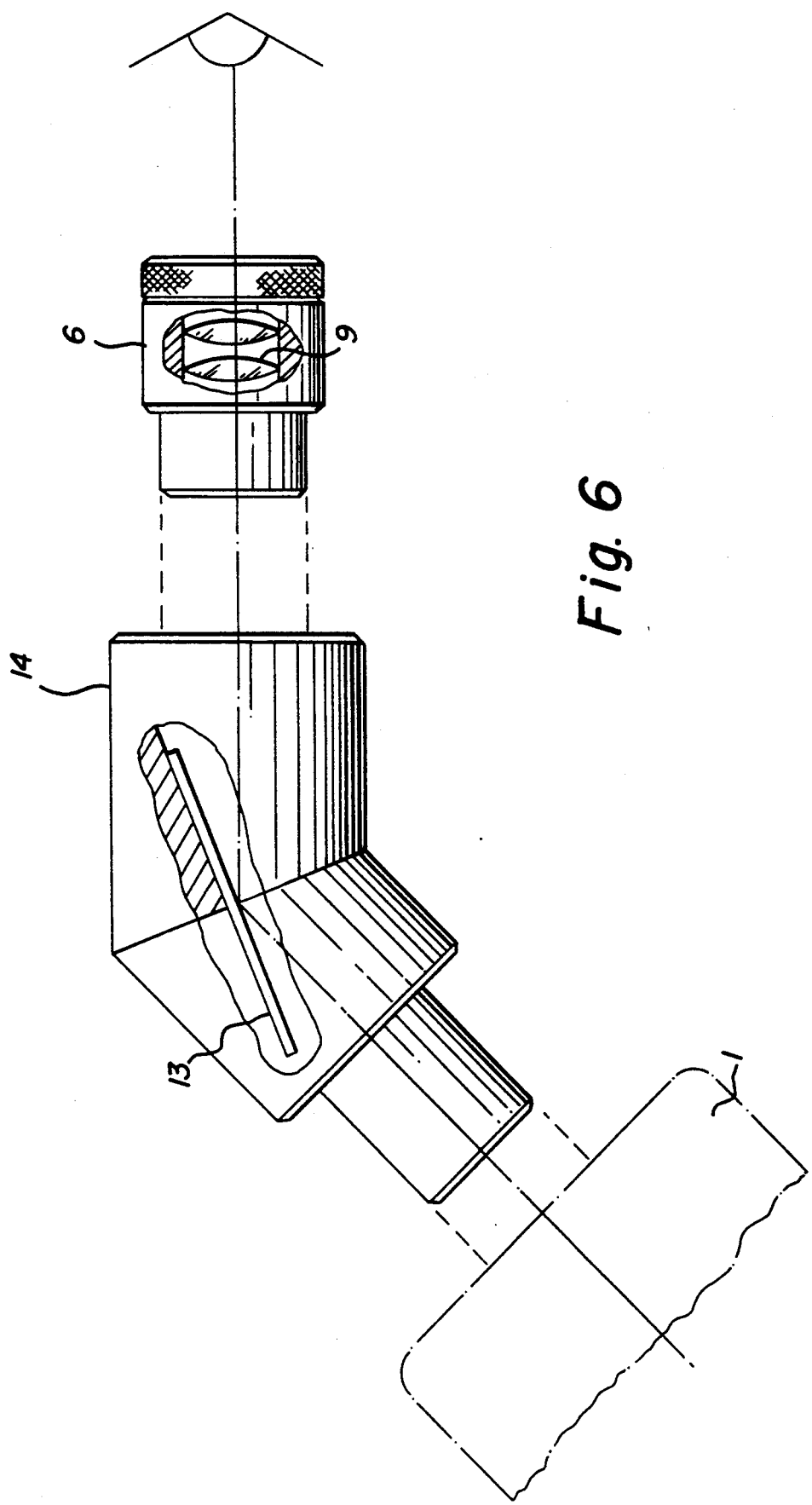
FIG. 6 is a side cut away view of the device of the present invention employing a mirror system.

FIG. 3 of the drawings, illustrates yet an additional embodiment of the present invention whereby the eye piece 6 is connected through a collar to a mirror housing as shown in greater detail in FIG. 6 of the drawings.

Directing attention now to FIG. 4 of the drawings, the embodiment of the present invention employing a prism system is illustrated in greater detail. The eye piece 6, containing a pair of lens 9, is connected by means of collar 11 to prism housing 15 containing prism 7 which deflects the viewing angle into the body of the microscope 1 through collar 10. A typical angle through which the prism deflects the line of sight is illustrated at A and can for example be about 135°.

Figure 5:
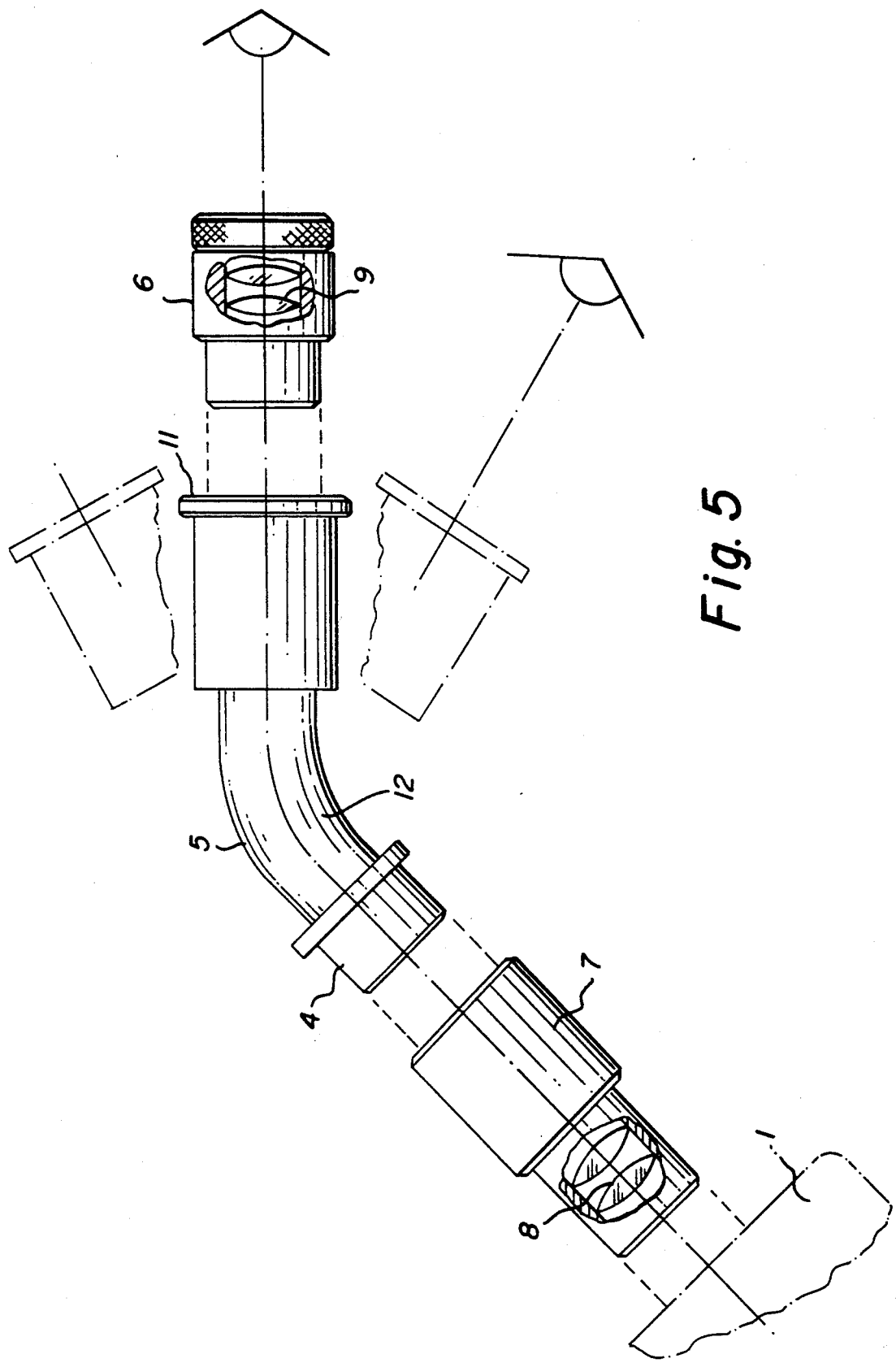
FIG. 5 is side partial cut away view of the device of the present invention employing a fiber optic bundle.

FIG. 5 of the drawings illustrates in greater detail the embodiment of the present invention wherein a fiber optic bundle is employed instead of a prism or mirrors to transmit the viewing image through the desired angle in accordance with the present invention. Eye piece 6 contains lenses 9 and is connected by mean of collar 11 to the fiber optic housing 5 which may be either rigid or flexible and which contains a fiber optic bundle 12. The collar 4 connects the fiber optic housing and eye piece with the image enhancing housing 7 containing lens 8 which fits into the body of the microscope 1.

FIG. 6 of the drawings illustrates the embodiment of the invention employing the system of mirrors in a greater detail. The eye piece 6 containing the lens 9 is inserted into the mirror housing 14 containing mirror 13 which deflects the line of site through the eye piece to the microscope body 1.

Figure 7:
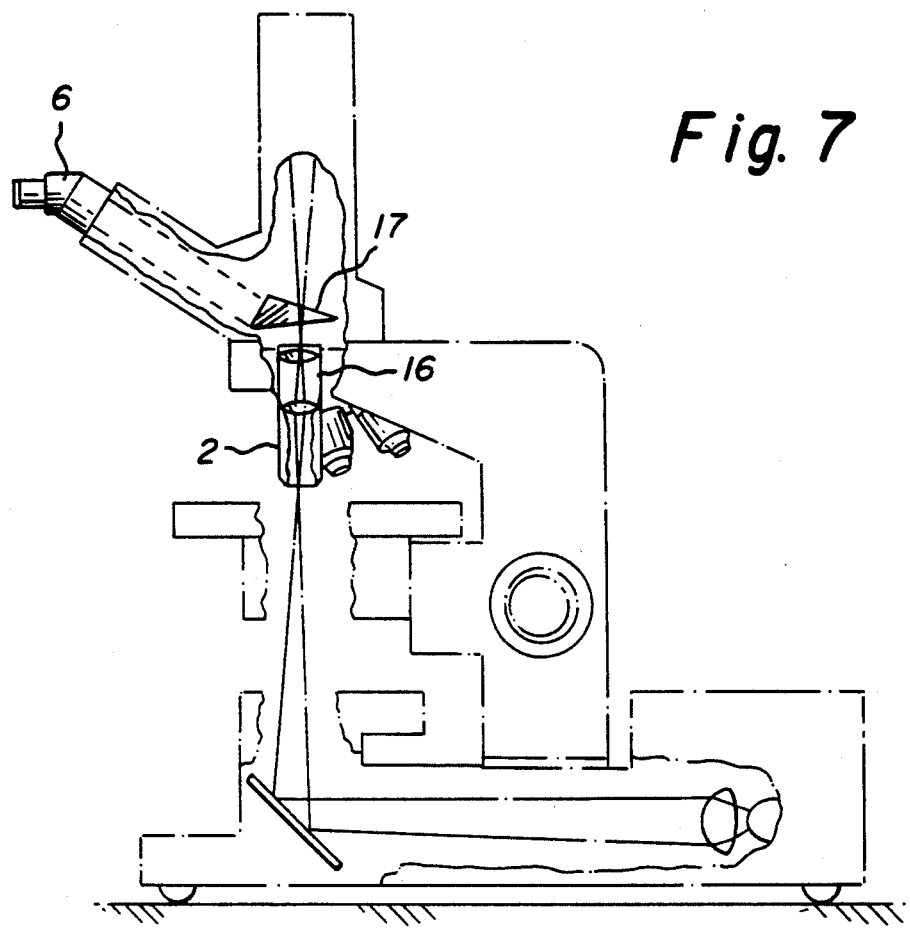
FIG. 7 is a partial side cut away view of a microscope fitted with the device of the present invention and including an optical correction module.

FIG. 7 illustrates yet an additional embodiment of the invention wherein the optical correction module which is employed to enhance the image transmitted to the eye piece is actually disposed adjacent the multiple objective lens of the microscope at 16. Thus, the image passing through the object lens 2 is optically corrected by the module 16 before it is deflected by prism 17 to the eye piece 6.

Figure 8:
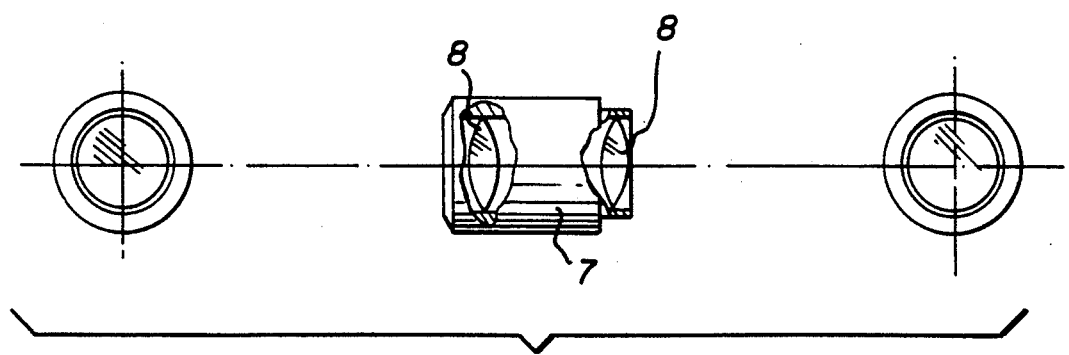
FIG. 8 is a partial side cut away view showing in detail the optical correction module of the invention.

FIG. 8 of the drawings illustrates in cut away cross-section detail the optical correction modular having a housing 7 and a pair of lens 8.

The device of the invention in its various embodiments can be retrofitted to any conventional microscope and does not require extensive modification of the microscope. In use, the device of the invention facilitates viewing through the scope by providing an improved angle for the eye piece so that less strain is placed on the individual using the microscope.

It will be apparent to those of ordinary skill in the art that other systems can be incorporated within the scope of the present invention t achieve the deflection of the image necessary when the viewing tube is at an oblique angle. For example, the device of the present invention can be used with any sort of optical microscope including those having a single or double eye piece. Other variations and embodiments will be apparent to those of ordinary skill in art and are considered to be within the scope of the present invention as defined herein in claims.

What is claimed is:

1. An optical system for use with a microscope which comprises an elongated tube having a longitudinal axis which is bent at an oblique angle; said elongated tube being adapted to join at one end to the body of a microscope in optical alignment therewith to receive an optical image from the microscope and being adapted to receive at its other end an optical eyepiece; said elongated tube being provided intermediate its ends with means for transmitting said optical image through said oblique angle from said end joined to the microscope to said end adapted to receive an eye piece.

2. The optical system of claim 1 wherein said optical image transmitting means is one or more prisms.

3. The optical system of claim 1 wherein said optical image transmitting means is a fiber optic bundle.

4. The optical system of claim 1 wherein the oblique angle is adjustable.

5. The optical system of claim 1 wherein said optical image transmitting means is one or more mirrors.

6. The optical system of claim 1 wherein said optical image transmitting means is a microscope head fixed at a 90° off - center position.

* * * * *